UNITED STATES PATENT OFFICE.

C. D. SMITH, OF CHICAGO, ILLINOIS.

IMPROVED COMPOSITION FOR PAINTING METALLIC ROOFS.

Specification forming part of Letters Patent No. 54,426, dated May 1, 1866.

*To all whom it may concern:*

Be it known that I, C. D. SMITH, of Chicago, in the county of Cook and State of Illinois, have produced a new and useful Composition for Painting Metallic Roofs or other Objects Exposed to the Atmosphere; and I do hereby declare that the following is a full and exact description thereof.

The object of my invention is to produce a composition which can advantageously be substituted for oil-paints and other substances now in use in painting metallic roofs or other metallic objects exposed to the action of the weather, said composition being made of such ingredients that when applied to the metallic roof or other object it forms a uniform, homogeneous coat with sufficient elasticity not to crack or scale off, as oil-paints and other substances do, but to remain unaffected either by heat, cold, or exposition to the changes of the weather.

To enable others skilled in the art to make and use my composition, I will describe its preparation.

I take sixty pounds of asphaltum and five pounds of gum-shellac, put them into a kettle with about two gallons of coal-tar or petroleum-oil, and heat them until they are thoroughly melted. I put twenty gallons of coal-tar and twenty gallons of petroleum-oil in another kettle and heat them to about 95°, so that the asphaltum and gum-shellac can readily unite with them. Then I mix all the above articles together, stirring them until the whole mass would become homogeneous. When it is a little cooled down I add ten gallons of benzine and five pounds of cut india-rubber to the composition and stir and mix the whole thing thoroughly. When it is cooled down it is ready to be barreled and used. The use of my composition in practice is done in the same way as of any oil-paint or other compositions.

What I claim as my invention, and desire to secure by Letters Patent, is—

A new article of manufacture consisting in a composition made of petroleum-oil, coal-tar, asphaltum, gum-shellac, india-rubber, and benzine, prepared in the proportion and manner as above described, and for the purposes specified.

C. D. SMITH.

Witnesses:
JOHN M. STILES,
J. B. TURCHIN.